United States Patent [19]

Egan et al.

[11] Patent Number: 4,880,432

[45] Date of Patent: Nov. 14, 1989

[54] PROCESS FOR PREPARING COLORED PARTICLES AND LIQUID DEVELOPER COMPOSITIONS THEREOF

[75] Inventors: Luke S. Egan, Kingston; Mitchell A. Winnik; Francoise M. Winnik, both of Toronto, all of Canada

[73] Assignee: Xerox Corporation, Stamford, Conn.

[21] Appl. No.: 143,790

[22] Filed: Jan. 11, 1988

[51] Int. Cl.$^4$ .............................................. C09B 69/10
[52] U.S. Cl. .......................................... 8/647; 8/509; 8/513; 8/514; 8/662; 8/675; 8/678; 8/679; 430/115
[58] Field of Search ............................................ 8/647

[56] References Cited

U.S. PATENT DOCUMENTS

| | | | |
|---|---|---|---|
| 3,637,596 | 1/1972 | Gulbins et al. | 260/47 |
| 4,051,138 | 9/1977 | Wang et al. | 8/647 |
| 4,093,793 | 6/1978 | Champenois | 526/221 |
| 4,144,252 | 3/1979 | Wang et al. | 8/647 |
| 4,282,304 | 8/1981 | Bayley | 430/137 |
| 4,339,237 | 7/1982 | Wang et al. | 8/647 |
| 4,382,800 | 5/1983 | Wang et al. | 8/647 |
| 4,476,210 | 10/1984 | Croucher et al. | 430/114 |
| 4,533,484 | 8/1985 | Walles et al. | 8/647 |

FOREIGN PATENT DOCUMENTS 816464u 1/1984 Japan .

*Primary Examiner*—A. Lionel Clingman
*Attorney, Agent, or Firm*—Judith L. Byotick

[57] ABSTRACT

Disclosed is a process for preparing particles colored with a dye which comprises: (a) forming, by a free radical dispersion polymerization process in a nonaqueous solution, polymeric particles having attached thereto stabilizing copolymers with at least one functional group capable of undergoing a chemical reaction with a dye, the particles having an average diameter of from about 0.1 to about 20 microns; (b) adding a dye to the polymeric particles having attached thereto stabilizing copolymers; and (c) effecting a chemical reaction between the dye and the stabilizing copolymers that results in the dye becoming covalently bound to the polymeric particles. Also disclosed is a liquid electrophotographic developer composition comprising a liquid medium, a charge control agent, and colored polymeric toner particles prepared as stated above and having an average diameter of from about 0.5 to about 5 microns.

30 Claims, No Drawings

PROCESS FOR PREPARING COLORED PARTICLES AND LIQUID DEVELOPER COMPOSITIONS THEREOF

BACKGROUND OF THE INVENTION

The present invention relates to a process for preparing colored particles. More specifically, the present invention is directed to a process which comprises preparing polymeric particles and subsequently reacting the polymeric particles with a dye to form a polymeric particle having a dye covalently bonded thereto. Particles prepared according to the process of the present invention are useful, for example, as colorants for liquid electrophotographic developers; thus, the present invention is also directed to liquid developer compositions comprising a liquid medium, a charge control agent, and the colored polymeric particles prepared according to the process disclosed herein.

Many methods are known for the preparation of polymer particles. For example, dispersion polymerization has been found to be a convenient method of preparing particles in a fluid medium; thus, polymeric particles having a diameter of up to 4 microns may be prepared in an aliphatic medium according to this method, as disclosed, for example, in "Luminescence Techniques in Polymer Colloids. 1. Energy-Transfer Studies in Non-Aqueous Dispersions", O. Pekcan, M. A. Winnik, L. S. Egan, and M. D. Croucher, Macromolecules, Vol. 16, pages 699–702 (1983), the disclosure of which is totally incorporated herein by reference. Processes for coloration of polymeric particles are also known, and include methods such as the use of polymerizable dyes as comonomers during the free-radical dispersion polymerization process in which the polymeric particle is formed, as disclosed in copending application U.S. Ser. No. 783,729/85, the disclosure of which is totally incorporated herein by reference. The process of this copending application comprises dissolving in a suitable solvent a mixture of at least two first monomer components including at least one second monomer having covalently attached thereto a dye moiety, subsequently adding to the resulting reaction mixture a polymerization initiator, thereafter effecting polymerization of the reaction mixture by heating, and separating the product particles therefrom. This process results in a polymeric particle wherein the dye entity is attached to the monomers prior to the polymerization reaction.

Methods of preparing dye labelled polymeric particles are also known. For example, the article entitled "Synthesis and Characterization of Fluorescently Labelled Poly(vinyl Acetate) Particles", L. Egan et al., Journal of Polymer Science, Vol. 24, pages 1895–1913 (1986), discloses a process for preparing nonaqueous dispersions of poly(vinyl acetate) particles stabilized with poly(2-ethylhexyl methacrylate) and labelled with fluorescent dyes in the core and stabilizer polymer phases. For preparation of particles containing a fluorescent dye label in the stabilizer portion, the processes disclosed entails providing a labelled stabilizer and reacting it with the core monomers to form the stabilized polymeric particles, as indicated on pages 1896 and 1903.

In addition, the coloration of polymeric particles by dye imbibition, as disclosed in U.S. Pat. No. 4,476,210, the disclosure of which is totally incorporated herein by reference, is known. This patent relates to a process for making a dyed stabilized liquid developer comprising marking particles dispersed in an aliphatic dispersion medium. The marking particles comprise a thermoplastic resin core with an amphipathic block or graft copolymer steric stabilizer irreversibly chemically or physically anchored to the resin core, and having a dye imbided in the resin core, said dye being soluble in the core material and insoluble in the liquid dispersion medium of the developer. In the developer disclosed in this patent, the dye is dispersed or dissolved in the polymeric particles that constitute the marking particles and no covalently bonded to the polymeric particles.

Another method of preparing colored particles is disclosed in U.S. Pat. No. 4,636,452. This patent discloses a method for producing electrophotographic liquid developers which comprises dissolving a first polymer in a highly insulating hydrocarbon medium that also contains a monomer. The polymer and monomer are selected such that each has a polar functional group having adsorptivity to the other molecule in the solution, and the monomer is then polymerized to produce a second polymer exhibiting low solubility in the medium and existing in substantially particulate form. Polymeric particles prepared according to this method are colored by dispersing or dissolving a dye molecule therein.

Also, a process for preparing dry toner compositions by dispersion polymerization is disclosed in U.S. Pat. No. 4,617,249. The process entails preparing a solvent medium containing dispersed steric stabilizers, monomers, and initiator compounds, adding a crosslinking compound, heating the mixture to polymerize the monomers, and separating the formed particles from the mixture. Coloration of the particles may be effected by diffusing a dye, present in a solvent solution, into the polymer mixture.

British Patent No. 1,181,287 discloses a method for preparing colored polymeric materials useful in electrophotographic developers, which method comprises preparing a material having the colorant covalently bound to it by polymerization of a monomer with a diazotized color material. Free radical dissociation of the diazotized coloring material then occurs, which results in the coloring material coupling to a polymer. Before it is suitable for use in a developer, the colored material is processed by methods such as wet grinding or ball milling. The process of the present invention, unlike the process disclosed in this patent, entails direct preparation of particles of the desired size, and no processing by grinding or milling is required to produce particles useful for applications such as liquid developers.

Japanese Patent Application No. 54029/78 discloses a liquid toner for electronic photography comprising a mixture of a first liquid toner and a second liquid toner, at least one of which contains a dielectric agent. The first liquid toner contains a nonpolar solvent, a thermoplastic synthetic binder dissolved in the solvent, and a dispersant. The second liquid toner contains a nonpolar solvent capable of being mixed with the first liquid toner; a graft amphipathic polymer having a polymer main chain portion and a polymer graft chain portion grafted to the main chain portion to form the amphipathic polymer, wherein one portion can be dissolved in the solvent and acts as a binder and a dispersant, and the other portion cannot be dissolved in the solvent but functions as a binder, and wherein at least one of the two components is thermoplastic. Regarding the second toner, the polymer component soluble in the solvent is dissolved in the solvent forming a continuous phase, while the polymer component insoluble in the solvent forms a dispersed phase resulting in the amphipathic polymer acquiring the functions of a binder and a dispersant as a single dispersed phase. The second toner may contain a colorant, which colorant may be either a pigment or a dye, and which colorant may be attached to the polymeric particles colloidally suspended in the liquid either chemically or by secondary forces or surface adhesive forces. If a dye is used as a chemically bonded colorant, the dye can be bonded with the amphipathic polymer after it is formed, or it can be bonded with the precursor or grafted side chain portions of the polymer prior to its formation, as indicated on pages 46 to 49 of the translated text. When the coloration process occurs by means of a chemical reaction between a dye and the amphipatic polymer, the reaction takes place between the dye and the reactive groups in the dispersed or insoluble phase, and not between the dye and reactive groups in the soluble phase. The patent does not, however, disclose the coloration of polymeric particles by reacting a dye molecule with reactive groups attached to the soluble stabilizing polymers.

Additionally, U.S. Pat. No. 3,753,760 discloses a liquid toner with a number of solids less than those conventionally used in a multicomponent liquid toner, obtained by combining the functional characteristics of plural previous different kinds of solids into a complex molecule, thereby obtaining better image fixation, improved resistance to preferential depletion, improved image definition, clear background, improved shelf life, improved functional life, and a broad color range. The toner comprises a liquid solvent system, an amphipathic polymeric molecule of the graft type having a polymeric backbone part and a polymeric graft part on said backbone part, said molecule being comprised of two moieties, at least one of which is thermoplastic, wherein one moiety is solvated by the solvent system and is a fixative and a dispersant, and the other moiety is insoluble in the solvent system, has a particle size between 25 millimicrons and 25 microns, and acts as a fixative, such that the polymeric molecule acts a mono-dispersed particle phase, a fixative, a dispersant, and a charge director. A coloring agent may be included as a moiety of the amphipathic molecule by means of a chemical bond, which bonding can be either to the precursor portions of the molecule prior to the graft or block polymerization of the added chains or to the chains added by graft or block polymerization. When the coloration process occurs by means of a chemical reaction between a dye and the amphipathic polymer, a reaction takes place between the dye and reactive groups in the dispersed or insoluble phase, and not between the dye and reactive groups in the soluble phase. The patent does not, however, disclose the coloration of polymeric particles by reacting a dye molecule with reactive groups attached to the soluble stabilizing polymers.

Although the prior art processes and compositions are suitable for their intended purposes, a need continues to exist for processes for preparing colored polymeric particles wherein the colorant is covalently bonded to the particle. A need also exists for a process wherein colored polymeric particles of a desired size may be prepared directly with no need for further processing to obtain particles of the desired size. In addition, a need exists for a process for preparing non-toxic colored polymeric particles. Further, there is a need for a process for obtaining dyed polymeric particles wherein the dye will not leach out from the particles in a liquid medium. Also, a need exists for a process for preparing colored particles suitable for use in electrophotographic liquid developers. A need also exists for a process for preparing colored particles wherein a wide choice of colors for the particles is available. In addition, there is a need for a process for preparing colored polymeric particles wherein the dye is covalently bonded to the polymer subsequent to the particle synthesis process, rather than prior to the preparation of the particles, since (1) dyes may undergo color changes when subjected to the conditions of a polymerization reaction, (2) the presence of dye molecules on the polymer prior to preparation of the particles can alter the solubility characteristics of this polymer and its suitability as a stabilizer, and (3) the presence of dye molecules on the stabilizer can affect the size and size distribution of the particles as well as the amount of stabilizer, and as a consequence the amount of dye incorporated into the particle. In addition, there is a need for a process for the coloration of particles in which the dye molecule is covalently bonded to the stabilizing polymer portion of the particles rather than to the polymeric cores of the particles. Also, a need exists for a process for the preparation of colored polymeric particles wherein two or more different dyes are covalently bonded to the polymer subsequent to the particle synthesis. There is also a need for a process for the coloration of particles in which the dye molecules are dispersed in the polymer in a manner that prevents dimerization or aggregation of the dye molecules, since dimers and aggregates often have a color different from that of the isolated dyed molecules, and particles containing these aggregates may possess reduced transparency. In addition, there is a need for liquid electrophotographic developer compositions containing colored particles having a dye covalently obtained to a stabilizing copolymer portion of the particle. A need exists for liquid developer compositions that are non-toxic and for which a wide range of color choices is available. Further, a need exists for a method of imaging with liquid developer compositions containing the above mentioned colored polymeric particles.

SUMMARY OF THE INVENTION

It is as object of the present invention to provide a process for preparing colored polymeric particles having many of the above noted advantages.

It is another object of the present invention to provide a process for preparing colored polymeric particles wherein the colorant is covalently bonded to the particle.

It is yet another object of the present invention to provide a process wherein colored polymeric particles of a desired size may be prepared directly with no need for further processing.

Still another object of the present invention resides in providing a process for preparing non-toxic colored polymeric particles.

Another object of the present invention is to provide a process for making dyed polymeric particles wherein the dye will not leach out from the particles in a liquid medium.

Yet another object of the present invention is to provide a process for preparing colored particles suitable for use in electrophotographic developers.

Still another object of the present invention is to provide a process for preparing colored particles wherein a wide choice of colors for the particles is available.

It is another object of the present invention to provide a process for preparing colored polymeric particles wherein the dye is covalently bonded to the stabilizer polymer subsequent to the polymerization process.

Another object of the present invention resides in the provision of a process for preparing colored polymeric particles wherein two or more different dyes may be covalently bonded to the polymeric particle subsequent to the particle synthesis.

Still another object of the present invention resides in the provision of a process for preparing colored polymeric particles wherein the dye molecules are dispersed in the polymer in a manner that prevents dimerization or aggregation of the dye molecules.

Yet another object of the present invention resides in the provision of liquid electrophotographic developer compositions containing colored particles having a dye covalently bonded to a stabilizing copolymer portion of the particle.

It is another object of the present invention to provide liquid developer compositions that are non-toxic and for which a wide range of color choices is available.

Another object of the present invention is to provide a method of imaging with liquid developer compositions containing the above mentioned colored particles.

These and other objects of the invention are achieved by providing a process for preparing particles colored with a dye which comprises: (a) forming, by a free radical dispersion polymerization process in a nonaqueous solution, polymeric particles with an average diameter of from about 0.1 to about 20 microns and having attached thereto stabilizing copolymers with at least one functional group capable of undergoing a chemical reaction with a dye; (b) adding a dye to the polymeric particles attached thereto stabilizing copolymers; and (c) effecting a chemical reaction between the dye and the stabilizing copolymers, thereby resulting in the dye becoming covalently bonded to the polymeric particles. Particlsle formed according to this process may be used as colorants for liquid electrophotographic developers, which developers are also within the scope of the invention. Liquid developer compositions of this type are prepared by admixing the colored polymeric particles prepared according to the process of the present invention with a liquid medium and a charge control agent. A method of imaging with liquid developer compositions containing colored particles prepared as described herein is also within the scope of the present invention.

According to the process of the present invention, colorless stabilized polymeric particles are first formed and subsequently colored by forming covalent bonds between the polymers and dye molecules. The polymeric particles comprise a macroscopic thermoplastic resin core to which is chemically or physically attached an amphipathic block or graft copolymer steric stabilizer. Amphiphatic copolymers are those which have one portion that possesses an affinity for one material and another portion that possesses an affinity for another different material. Fro example, one portion of the polymer might be soluble in a given solvent and the other portion might be insoluble in that solvent. When resin particles having amphipathic copolymeric moieties physically or chemically attached to them are dispersed in a liquid medium, the copolymers function as steric stabilizers by overcoming mutually attractive forces between the particles in the solution; attractive forces between adjacent polymeric particles in the liquid medium are screened by the steric repulsion effect of the stabilizing copolymers, and the particles are thereby maintained separate, and prevented from flocculating. Suitable stabilizing block copolymers include those containing a portion selected from materials such as acrylates, such as poly(alkyl acrylate) or poly(alkyl methacrylate) with the alkyl group having at least three carbon atoms and as many as about 25 carbon atoms, and a portion selected from materials such as poly(N-vinyl-2 pyrrolidone), poly(vinyl acetate), poly(ethyl acrylate), poly(methyl methacrylate), poly(methyl acrylate), polystyrene, and the like. Other examples of stabilizing copolymers include block copolymers such as poly(vinyl acetate - b - dimethyl siloxane), poly(styrene - b - dimethyl siloxane), poly(styrene-b-hydrogenated isoprene), poly(methyl methacrylate - b - dimethylsiloxane), poly(vinyl acetate - b - isobutylene), poly(vinyl acetate - b - 2-ethyl hexyl methacrylate), poly(styrene-b-2-ethyl hexyl methacrylate), poly(ethyl methacrylate - b - 2-ethyl hexyl methacrylate), and poly(dimethylsiloxane-styrene-dimethyl siloxane).

Stabilizing copolymers may also be graft copolymers either added to the particle formation reaction medium or generated in-situ during particle synthesis from a suitable aliphatic hydrocarbon-soluble polymer which serves as the stabilizer precursor. In the latter situation, the stabilizer precursor is added to the core monomer in the same manner as that for a copolymer. The precursor polymer then grafts to some of the polymers comprising the macroscopic core material, thereby forming a stabilizing moiety. This stabilizer precursor and/or the backbone portion of the graft copolymer may be selected from materials such as polyisobutylene; hydrogenated polybutadiene; hydrogenated polyisoprene; polydimethylsiloxane; poly(vinyl toluene); poly(12-hydroxy stearic acid); poly(iso bornyl methacrylate); acrylic and methacrylic polymers of long chain esters of acrylic and methacrylic acid such as stearyl, lauryl, octyl, hexyl and 2-ethyl-hexyl; polymeric vinyl esters of long chain acids such as vinyl stearate, vinyl laurate, and vinyl palmitate; polymeric vinyl alkyl ethers, including poly(vinyl ethyl ether), poly(vinyl isopropyl ether), poly(vinyl isobutyl ether), and poly(vinyl n-butyl ether); other polymers of vinyl monomers; and copolymers of the above. Preferred stabilizers or stabilizer precursors include polyisobutylene, particularly its copolymers with isoprene containing from 1 to 3% unsaturation, polydimethyl siloxane, acrylates such as poly(2-ethyl hexyl acrylate), poly(2-ethyl hexyl methacrylate, poly(lauryl methacrylate), and copolymers of acrylates of methacrylates with alkyl groups having 8 to 12 carbons and 0.1 to 5 percent monomers such as allyl methacrylate, N,N-dimethylaminoethyl methacrylate, and benzyl methacrylate to promote the grafting reaction. Suitable monomers for the graft portion of graft polymer stabilizers include vinyl monomers such as vinyl acetate, acrylates, such as methyl acrylate, methyl methacrylate, ethyl acrylate, ethyl methacrylate, acrylonitrile, acrylamide, methacrylonitrile, methacrylamide, acrylic acid, methacrylic acid, maleates such as monoethyl maleate, fumarates such as monoethyl fumarate, styrene, maleic anhydride, maleic acid, and N-vinyl-2-pyrrolidone. Preferred materials include vinyl acetate, N-vinyl-2-pyrrolidone, ethyl acrylate, n-butyl methacrylate, styrene, butadiene, and mixtures thereof.

For the polymeric particles of the present invention, the steric stabilizer copolymers must contain a moiety capable of undergoing a reaction with a dye molecule that results in the dye molecule becoming covalently bound to the stabilizing copolymer. Accordingly, the steric stabilizer copolymers are prepared from monomers such as those indicated wherein one of the monomers possesses a suitable reactive site, such as an isocyanate group. For example, the stabilizing copolymers may be prepared by polymerizing monomers of 2-ethylhexyl methacrylate and isocyanatoethyl methacrylate to obtain stabilizers having an isocyanate group. Other examples of reactive monomers include acryloyl chloride, methacryloyl chloride, vinyl chloroformate, anhydrides such as maleic anhydride, and polymerizable derivatives of activated esters, such as acrylates or methacrylates of nitrophenol, dinitrophenol, Nhydroxysuccinimide, 1-hydroxybenzotriazole, and the like. The preferred reactive group is an isocyanate group. Generally, the stabilizing copolymer is prepared such that the monomer possessing the reactive site is present in an amount of from about 1 to about 30 percent by weight of the stabilizing copolymer and the remaining portion with no reactive site is present in an amount of from about 70 to about 99 percent by weight of the stabilizing copolymer.

The stabilizing copolymers may be generated in-situ during the particle formation reaction or made separately by any suitable process. For example, a graft copolymer may be prepared by methods well-known in the field of polymer synthesis as described by P. Rempp and E. W. Merrill in "Polymer Synthesis", Hüthig & Wepf Verlag, Basel, Switzerland, 1986, pp 214–219, the disclosure of which is totally incorporated herein by reference. A block copolymer may be prepared by methods well-known in the field of polymer synthesis as described by P. Rempp and E. W. Merrill in "Polymer Synthesis", Hüthig & Wepf Verlag, Basel, Switzerland, 1986, pp 220–224, the disclosure of which is totally incorporated herein by reference.

After the stabilizing copolymers have been prepared, an additional monomer or mixture of monomers is added to the reaction mixture in the presence of a polymerization initiator to obtain thermoplastic resin particles having chemically or physically attached thereto the sterically stabilizing copolymers. The monomers chosen should be capable of undergoing nonaqueous dispersion polymerization, in that the monomers are soluble in the reaction medium, but the polymers formed upon polymerization are insoluble. In addition, the monomers chosen should not react with the reactive groups attached to the stabilizer. Suitable core materials may comprise any suitable thermoplastic resin, and include acrylate polymers and polymers of vinyl monomers, such as poly(vinyl acetate), poly(N-vinyl-2-pyrrolidone), poly(methyl methacrylate), poly(methyl acrylate), poly(ethyl acrylate), poly(ethyl methacrylate), poly(2-ethoxyethyl methacrylate), poly(butoxy ethoxy ethyl methacrylate), poly(dimethyl amino ethyl methacrylate), poly(acrylic acid), poly(methacrylic acid), poly(acrylamide), poly(methacrylamide), poly(acrylonitrile), poly(vinyl chloride), poly(ureido-ethyl vinyl ether), and polystyrene. Preferred materials include homopolymers of vinyl acetate, N-vinyl-2-pyrrolidone, methyl methacrylate, styrene, and ethyl acrylate, and copolymers of any of these monomers.

The polymeric particles are prepared by adding an excess amount of the core monomer to a solution containing the stabilizing copolymer in the presence of a free radical initiator at atmospheric pressure and at temperatures of from about 60° C. to about 90° C. Over a period of from about 8 to about 20 hours, the polymeric core is grown in the presence of the stabilizing copolymer resulting in a dispersion of particles of relatively uniform size in the range of from about 0.1 to about 20 microns. During the growth of the polymeric core, the stabilizing copolymer acts as a steric stabilizer to keep the individual growing particles separate in the dispersion. Also, during the process, the stabilizing copolymers become irreversibly physically or chemically bound to the core polymeric material forming a thermodynamically stable particle.

Particles formed by this process generally range in average diameter of from about 0.1 to about 20 microns, as determined by measurement with apparatus such as a Brookhaven particle sizer. The size of the particles formed may be controlled by adjusting reaction conditions such as the amount of stabilizer present, the solvent chosen, and the reaction temperature. Generally, the stabilizer is present in an amount of from about 2 percent to about 20 percent by weight with respect to the amount of the monomer to be polymerized into the core material. Increasing the relative amount of stabilizer tends to decrease the size of the particles, whereas decreasing the amount of stabilizer relative to the amount of monomer tends to increase the size of the particles.

Regarding the solvent or liquid dispersion medium selected for the polymerization process, suitable solvents include those disclosed herein as suitable liquid dispersion media for liquid developers. Addition of polar or polarizable solvents to the reaction medium tends to increase the particle size as explained by B. Williamson, R. Lukas, M. A. Winnik, and M. D. Croucher in J. Colloids Interface Science, Vol. 119, pages 59–564 (1987), the disclosure of which is totally incorporated herein by reference. Polymerization generally takes place at temperatures between about 50° C. and about 100° C. By adjusting these conditions, particles of uniform size and of the desired size may be obtained. The subsequent dyeing process does not alter the sizes of the particles; accordingly, the sizes of the colored particles are controlled by the polymerization conditions under which the uncolored particles are formed. For use of the colored particles of the present invention in applications such as colorant particles for liquid electrophotographic developers, particle sizes of from about 0.1 to about 4 microns are preferred.

Once the dispersion of polymeric particles has been prepared, the particles are colored by reacting them with the selected dye. Dyes suitable for the process of the present invention include any dyes capable of reacting with a functional group on a stabilizing copolymer. Reactions suitable for covalently attaching a dye molecule to a polymeric particle include condensation reactions of isocyanates with alcohol-substituted dyes or with amine-substituted dyes. For example, when the steric stabilizer possesses isocyanate groups, dyes having either hydroxyl or amino groups will be suitable since they are capable of undergoing a condensation reaction with the isocyanate group on the stabilizer. The preferred method of attaching the dye to the polymeric particle is by a condensation reaction of an anhydride with an amino-substituted dye.

In addition to possessing a functional group capable of undergoing a chemical reaction with the reactive groups on the stabilizer, suitable dyes generally are soluble in aliphatic hydrocarbon solvents or in mixtures of solvents comprising an aliphatic hydrocarbon and a polar or polarizable co-solvent, such as tetrahydrofuran, ethyl acetate, acetone, or dichloromethane. The chromophore of the dye may be selected among several classes of dyes, including, for example, the anthraquinone, azo, xanthene, methine, polymethine, azamethine, quinoline, stilbene, and oxazine dyes. Illustrative examples of azo chromophores include solvent yellow 2, solvent yellow 58, solvent red 19, solvent red 27, disperse yellow 60, disperse orange 5, disperse orange 30, disperse orange 138, disperse red 1, disperse red 13, disperse red 41, disperse red 58, disperse red 72, disperse red 73, disperse red 90, disperse red 156, disperse red 210, disperse black 4, disperse black 7, disperse blue 183, disperse blue 165, dispersol fast red R, SRA brilliant blue 4, pigment red 100, and the like. Illustrative examples of xanthene dyes include bacic red 1, basic red 8, solvent red 45, and the like. Illustrative examples of methine and polymethine dyes include disperse yellow 31, disperse yellow 61, disperse yellow 99, basic violet 7, basic violet 16, and the like. Illustrative examples of anthraquinone dyes include solvent red 52, solvent violet 13, solvent blue 36, solvent blue 69, solvent green 3, pigment red 89, disperse red 4, disperse violet 6, disperse blue 3, disperse blue 6, disperse blue 23, disperse blue 28, disperse blue 34, disperse blue 60, disperse blue 73, reactive blue 6, and the like.

Additional examples of anthraquinone dyes suitable for the coloration of particles include 1-phenylthio-5-(3'-aminophenylthio)anthraquinone, 1-(3'-aminophenyl(thio-(4'-tert-butylphenyltio)anthraquinone, 4-amino-1,8-dihydroxy-2,7-diisobutyl-5-(4'-aminophenylamino)-anthraquinone, N-(4'-aminobutyl) 1,4-diaminoanthraquinone-2,3-dicarboximide, N-(3'-hydroxypropyl) 1,4-diaminoanthraquinone-2,3-dicarboximide, N-[N',N'-bis(2'-hydroxyethyl)aminopropyl 1,4-diaminoanthraquinone-2,3-dicarboximide, 1-amino-4-hydroxy-2-(3'-aminopropylamino)-anthraquinone, 1-amino-4-hydroxy-2-(6'-hydroxyhexylamino)-anthraquinone, 1-amino-4-hydroxy-2-(6'-hydroxyhexylthio)-anthraquinone, 1,5-dihydroxy-2,6-disobutyl-4-(3'-aminophenylthio)-anthraquinone, 1,4,5-triphenylthio-8-(3'-aminophenylthio)-anthraquinone.

Preferred yellow dyes include dyes of the general Formula 1, where X is a hydroxy or amino group, R is an alkyl substituent with from 1 to about 20 carbon atoms, such as methyl, ethyl n-butyl tert-butyl, and Ar is an aromatic group or a substituted aromatic group with from 6 to about 24 carbon atoms, such as phenyl, 2-chlorophenyl, 2,4,6-trichlorophenyl,2-methoxyphenyl, 4-methoxyphenyl, 2-nitrophenyl, 4-nitrophenyl, 2-benzamidophenyl, and the like.

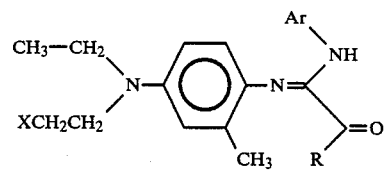

Formula 1 - Yellow Dye

Dyes of Formula 1 may be prepared by adding sequentially, to a solution of 2-(p-carboxyphenoxy)-2-pivaloyl-2',4'-dichloroacetanilide in methanol, a 5% solution of sodium carbonate in water, N'-ethyl-N'-(2'-hydroxyethyl)1,4-diamino-2-methylbenzene, and potassium persulfate, stirring the mixture at room temperature for about 15 minutes, and cooling it in an ice bath for about 30 minutes, resulting in a precipitate of the dye. Preferred magenta dyes include dyes of the general Formula 2, where X is a hydroxyl or amino group, Y is an alkyl group with from 1 to about 20 carbon atoms, such as methyl, ethyl, n-propyl, n-butyl, an aromatic group with from 6 to about 24 carbon atoms, such as phenyl 4-methylphenyl, or a functional substituent such as phenylamino, amino,4'-nitrophenylamino, acetamido, and Ar is an aromatic group or substituted aromatic group with from 6 to about 24 carbon atoms, such as phenyl, 4-chlorophenyl, 2-chlorophenyl, and 2,4,6-trichlorophenyl.

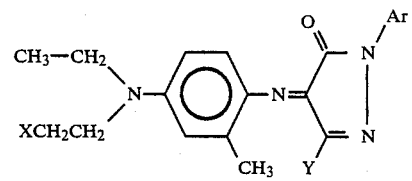

Formula 2 - Magenta Dye

Dyes of Formula 2 may be prepared by adding sequentially, to a solution of 2-chlorophenol is methanol, a 5% solution of sodium carbonate in water, N'-ethyl-N'-(2'-hydroxyethyl)-1,4-diamino-2-methylbenzene, and potassium persulfate, stirring the mixture at room temperature for about 15 minutes, extracting the mixture with dichloromethane, drying the dichloromethane solution over magnesium sulfate, filtering it by gravity, and drying it on a rotary evaporator, resulting in a residue constituting the dye. Preferred cyan dyes include dyes of the general Formula 3, where X is an amino or a hydroxyl group; and Y is a substituent such as methyl, ethyl, methoxy, halo, and acetamido.

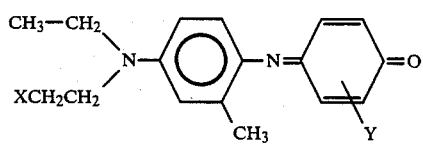

Formula 3 - Cyan Dye

Dyes of Formula 3 may be prepared by adding sequentially, to a solution of 1-(2,4,6-trichlorophenyl)3-p-nitroanilino)2-pyrazolin-5-one in methanol, a 5% solution of sodium carbonate in water, N'-ethyl-N'-(2'- hydroxyethyl)1,4-diamino-2-methylbenzene, and potassium persulfate, stirring the mixture as room temperature for about 15 minutes, cooling it in an ice bath for about 30 minutes, and adding to the cold mixture an amount of cold water, resulting in a precipitate of the dye. Other preferred cyan dyes are dyes of general Structure 4, where X is an amino or hydroxyl substituent and R is an alkyl group with from 1 to about 20 carbon atoms, such as methyl, ethyl, propyl, or an aromatic group or substituted aromatic group with from 6 to about 24 carbon atoms, such as phenyl, 4-methoxyphenyl, 2-methoxyphenyl, 2-chlorophenyl, 4-chlorophenyl,4-nitrophenyl.

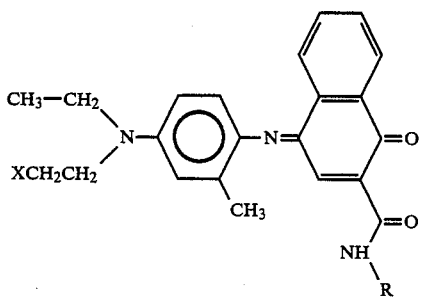

Structure 4 - Cyan Dye

In addition, the process of the present invention includes processes wherein more than one type of dye is covalently bonded to the same polymeric particle. For example, a green particle may be prepared by forming polymeric particles having attached thereto stabilizing copolymers as described herein, and subsequently reacting the particles with a blue dye and a yellow dye to form a green particle. The color obtained may be controlled by adjusting the amounts of each dye present.

The reaction resulting in coloration of the polymeric particles is performed by adding to the previously formed polymeric particles, which are suspended in a liquid dispersing medium, the selected dye and a small amount of a catalyst such as dibutyltindilaurate. The particles are colored by adding a solution or suspension of a dye, present in an amount of from about 0.1 to 10 percent by weight in an aliphatic hydrocarbon solvent, to a dispersion of the particles in the same solvent, wherein the particles are present in an amount of from about 5 to about 30 percent by weight. In some instances, it may be advantageous to dissolve the dye in a solvent mixture comprising an aliphatic hydrocarbon and polar co-solvents, such as acetone, tetrahydrofuran, ethyl acetate or dichloromethane. The amount of the polar solvent present in the solvent mixture is limited so as not to destroy the particulate nature of the dispersion. Subsequently, the reaction mixture is stirred and the catalyst is then added to the reaction mixture in amounts from about 0.001 to about 1 percent by weight of the reaction mixture. The reaction is carried out at temperatures ranging from about 0° C. to about 60° C. at atmospheric pressure over a period of from about 1 to about 24 hours. The colored particles are separated from the reaction medium and purified by repeated centrifugations and resuspensions in an aliphatic hydrocarbon solvent.

Particles prepared according to the process of the present invention exhibit several advantages. For example, since the dye is covalently bonded to the particle, problems related to dye leaching and dye toxicity are reduced or eliminated. Moreover, since the dyes are reacted with the particles are the polymerization step, they need not be stable with respect to free-radical polymerization initiators. This aspect of the invention can be significant, since for prior art coloring methods employing polymerizable dyes, it has been observed that the dye will often change color during the polymerization process. In addition, the process of the present invention enables the preparation of polymeric particles of a desired size with no need for further processing. For certain applications, one might want to control the particle size, such as when the particles are included in liquid developers; in liquid developers, smaller particles, such as those of from about 0.1 to about 5 microns in average diameter, provide developed images of acceptable resolution, whereas longer particle sizes may be desired for other applications. The particle size is controlled by the composition of the reaction medium, including such features as the amount of monomer present, the ratio of stabilizer or stabilizer precursor to monomer, the amount of initiator, the polarity of the solvent, and the reaction temperature. Further, the choice of colors for the particles is very wide, being limited only by the availability of dyes capable of reacting with the stabilizing portion of the polymeric particle.

Particles prepared according to the disclosed process may be incorporated into a liquid developer composition suitable for developing electrostatic latent images. Such compositions may comprise, for example, nonaqueous dispersions of the colored particles illustrated herein dispersed in a suitable liquid medium, and a charge control agent such as a metal soap. Typical liquid media are colorless, odorless, nontoxic and nonflammable, having flash points greater than 104° F., and include aliphatic hydrocarbons, A particularly preferred group of materials are many petroleum distillates such as the Isopars ®, including Isopar ® G, Isopar ® H, Isopar ® K and Isopar ® L, available from Exxon. Also included in this group are Amsco 460 Solvent and Amsco OMS, available from American Mineral Spirits Company. In addition, Phillips Petroleum's Soltrol, Mobil Oil's Pagasol, and Shell Oil's Shellsol may be used. The liquid developer preferably includes a charge control agent to give the particle charge in order for it to undergo electrophoresis in an electric field. Any suitable charge control agent selected from the well known agents for such purpose may be used. Useful charge control agents include the lithiun, cadmium, calcium, manganese, magnesium and zinc salts of heptanoic acid; the barium, aluminum, cobalt, manganese, zinc, cerium and zirconium salts of 2-ethyl hexanoic acid, (these are known as metal octoates); the barium, aluminum, zinc, copper lead and iron salts of stearic acid, the calcium, copper, manganese, nickel, zinc and iron salts of naphthenic acid; and ammonium lauryl sulfate, sodium dihexyl sulfosuccinate, sodium dioctyl sulfosuccinate, aluminum diisopropyl salicylate, aluminum dresinate, aluminum salt of 3,5 di-t-butyl gamma resorcylic acid. Mixtures of these materials may also be used. A preferred material for our purposes is zirconium octoate, which provides a positive charge on the synthetic resin particles.

Specific examples of liquid ink developer compositions, therfore, include those comprising a dispersion of colored particles prepared in accordance with the process of the present invention in Isopar ® G, wherein the particles are present in an amount of from about 0.2 to about 3 percent by weight, a charge control agent such as zirconium octoate is present in an amount of from about 0.05 to about 0.5 percent by weight, and the Isopar ® G is present in an amount of from about 96.5 to about 99.75 percent by weight. Preferably, the particles are of an average diameter of from 0.1 to about 5 microns to enable the development of images of acceptable resolution. Subsequent to the preparation of the developer composition, the particles possess a charge to mass ratio of about 100 to 1,000 microcoulombs per gram. The above mentioned liquid developers are useful in known imaging and printing processes, including, for example, the printing process employed by the Versatec ® V-80 printer. These liquid developers may be employed in imaging methods wherein an electrostatic latent image is formed on an imaging member, developed with the developer composition illustrated herein, transferred to a suitable substrate, and thereafter permanently affixed thereto.

Specific embodiments of the invention will now be described in detail. These examples are intended to be illustrative, and the invention is no limited to the materials, conditions, or process parameters set forth in these embodiments. All parts and percentages are by weight unless otherwise indicated.

EXAMPLE I

Preparation of a yelow dye of Formula I

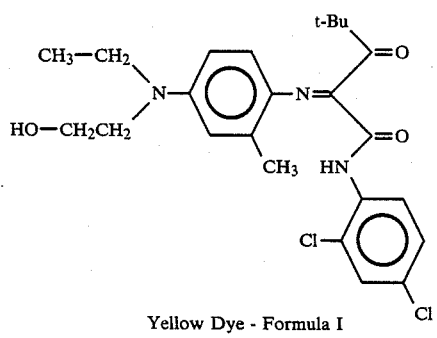

Yellow Dye - Formula I

To a solution of 4.261 grams of 2-(p-carboxyphenoxy)-2-pivaloyl-2',4'-dichloroacetanilide in 10 milliliters of methanol were added sequentially 200 milliliters of a 5% solution of sodium carbonate in water, 2.927 grams of N'-ethyl-N'-(2'-hydroxyethyl)-1,4-diamino-2-methylbenzene, and 6.00 grams of potassium persulfate. Subsequently, the mixture was stirred at room temperature for 15 minutes and then cooled in an ice bath for 30 minutes. The precipitate formed was separated by filtration, washed with 200 milliliters of water, and recrystallized from 300 milliliters of ethanol/water 8/2 v/v, yielding 4.33 grams of the pure yellow dye of Formula I exhibiting a melting point of 142° C. and a visible absorption spectrum maximum at 400 nm (nanometers).

EXAMPLE II

Preparation of a cyan dye of Formula II

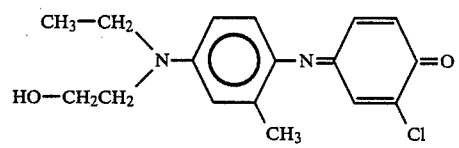

Cyan Dye - Formula II

To a solution of 2.571 grams of 2-chlorophenol in 70 milliliters of methanol were added sequentially 200 milliliters of a 5% solution of sodium carbonate in water, 5.840 grams of N'-ethyl-N'-(2'-hydroxyethyl)-1,4-diamino-2-methylbenzene, and 12.0 grams of potassium persulfate. The mixture was stirred at room temperature for 15 minutes, after which the resulting mixture was extracted three times with 100 milliliters of dichloromethane. Subsequently, the dichloromethane solution was dried over magnesium sulfate, filtered by gravity, and then taken to dryness on a rotary evaporator. The residue was recrystallized from 300 milliliters of methanol, yielding 6.35 grams of the pure cyan dye of Formula II exhibiting a melting point of 140° C. and a visible absorption spectrum maximum at 640 nm.

EXAMPLE III

Preparation of a magenta dye of Formula III

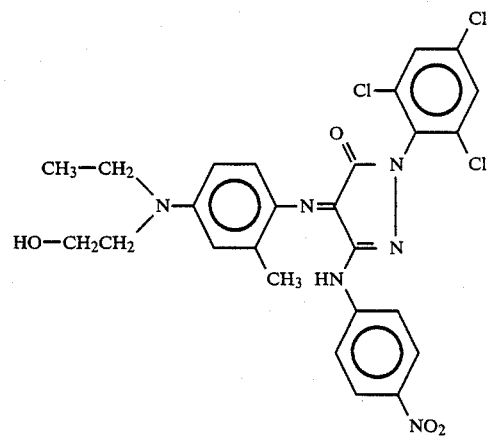

Magenta Dye - Formula III

To a solution of 4.00 grams of 1-(2,4,6-trichlorophenyl)-3-p-nitroanilino)2-pyrazolin-5-one in 105 milliliters of methanol were added sequentially 200 milliliters of a 5% solution of sodium carbonate in water, 2.945 grams of N'-ethyl-N'-(2'-hydroxyethyl)-1,4-diamino-2-methylbenzene, and 6.00 grams of potassium persulfate. Subsequently, the mixture was stirred at room temperature for 15 minutes and then cooled in an ice bath for 30 minutes. To the cold mixture were added 200 milliliters of cold water. The resulting precipitate was separated by filtration, washed with 400 milliliters of water, and recrystallized from 300 milliliters of methoxyethanol, yielding 5.90 grams of the pure magenta dye of Formula III exhibiting a melting point of 278° C. and a visible absorption spectrum maximum at 540 nm.

EXAMPLE IV

Preparation of yellow particles

Colorless polymeric particles having reactive stabilizers attached thereto were prepared by the addition of 0.54 gram of azobisisobutyronitrile to a mechanically stirred (50 rpm), deoxygenated mixture of 28.9 grams of freshly distilled 2-ethylhexyl methacrylate and 2.85 grams of isocyanotoethyl methacrylate in 140 milliliters of isooctane. The solution was stirred at 70° C. for 18 hours, after which the heat was removed and the solution was allowed to cool to room temperature. To 50 milliliters of the cooled solution were added 29.8 grams of vinyl acetate, 24 milliliters of isooctane, and 0.11 grams of azobisisobutyronitrile. The reaction mixture was then stirred mechanically (50 rpm) at 75° C. for 16 hours and then at 90° C. for 1.5 hours, after which particle formation was observed. Particles formed during the process were washed by repeated centrifugation/resuspension cycles with isooctane. Infrared analysis indicated a band at 2280 cm$^{-1}$ confirming the presence of isocyanate groups. The particles had an average diameter of 120 nanometers as measured with a Brookhaven Particle Sizer.

The colorless particles thus formed were subsequently colored by reaction with a dye as follows. A solution of 60 milligrams of a yellow dye of Formula I in 1 milliliter of tetrahydrofuran was added to 10 milliliters of a stirred suspension of the particles containing 10 percent by weight of the particles in isooctane. To this suspension were then added 2 drops of dibutyltindilaurate, and the suspension was stirred at room temperature for 24 hours. The resulting yellow particles were washed by three consecutive decantation/resuspension cycles with 25 milliliters of cyclohexane. UV/Visible spectroscopy determined the concentration of dye in the particles to be about 1.4 percent by weight. The absence of the characteristic isocyanate band in the infrared at 2280 cm$^{-1}$ confirmed that all reactive groups in the stabilizer layer underwent condensation with the dye.

EXAMPLE V

Preparation of cyan particles

Colorless particles prepared as described in Example IV were colored by reaction with the cyan dye of Formula II as follows. A solution of 60 milligrams of a cyan dye of Formula II in 1 milliliter of tetrahydrofuran was added to 10 milliliters of a stirred suspension of the colorless particles containing 10 percent by weight of the particles in isooctane. To this suspension were then added 2 drops of dibutyltindilaurate, and the suspension was stirred at room temperature for 24 hours. The resulting cyan particles were washed by three consecutive decantation/resuspension cycles with 25 milliliters of cyclohexane. UV/Visible spectroscopy determined the concentration of dye in the particles to be about 1.1 percent by weight. The absence of the characteristic isocyanate band in the infrared at 2280 cm$^{-1}$ confirmed that all reactive groups in the stabilizer layer underwent condensation with the dye.

EXAMPLE VI

Preparation of magenta particles

Colorless particles prepared as described in Example IV were colored by reaction with the magenta dye of Formula III as follows. A solution of 60 milligrams of the magenta dye of Formula III in 1 milliliter of tetrahydrofuran was added to 10 milliliters of a stirred suspension of the particles containing 10 percent by weight of the particles in isooctane. To this suspension were then added 2 drops of dibutyltindilaurate, and the suspension was stirred at room temperature for 24 hours. The resulting magenta particles were washed by three consecutive decantation/suspension cycles with 25 milliliters of cyclohexane. UV/Visible spectroscopy determined the concentration of dye in the particles to be about 0.9 percent by weight. The absence of the characteristic isocyanate band in the infrared at 2280 cm$^{-1}$ confirmed that all reactive groups in the stabilizer layer underwent condensation with the dye.

EXAMPLE VII

Preparation of red particles

Colorless particles prepared as described in Example IV were colored by reaction with a mixture of the yellow dye of Formula I and the magenta dye of Formula III as follows. A solution of 35 milligrams of the yellow dye of Formula I and of 25 milligrams of the magenta dye of Formula III in 1 milliliter of tetrahydrofuran was added to 10 milliliters of a stirred suspension of the particles containing 10 percent by weight of the particles of isooctane. To this suspension were then added 2 drops of dibutyltindilaurate, and the suspension was stirred at room temperature for 24 hours. The resulting red particles were washed by three consecutive decantation/resuspension cycles with 25 milliliters of cyclohexane. The absence of the characteristic isocyanate band in the infrared at 2280 cm$^{-1}$ confirmed that all reactive groups in the stabilizer layer underwent condensation with the dyes.

EXAMPLE VIII

Preparation of yellow particles

Colorless polymeric particles having reactive stabilizers attached thereto were prepared by the addition of 0.54 gram of azobisisobutyronitrile to a mechanically stirred (50 rpm), deoxygenated mixture of 28.9 grams of freshly distilled 2-ethylhexyl methacrylate, 2.85 grams of isocyanotoethyl methacrylate, and 0.32 gram of allyl methacrylate in 140 milliliters of isooctane. The solution was stirred at 70° C. for 18 hours, after which the heat was removed and the solution was allowed to cool to room temperature. To 25 milliliters of the cooled solution were added 10 milliliters of methyl methacrylate, 100 milliliters of cyclohexane, and 0.41 gram of azobisisobutyronitrile. The reaction mixture was stirred mechanically (50 rpm) at 70° C. for 17 hours. Subsequently, 0.10 gram of azobisisobutyronitrile was added to the reaction mixture, which was then stirred at 70° C. for 4 hours. Particles formed during the process were washed by repeated centrifugation/resuspension cycles with 25 milliliters of cyclohexane. Infrared analysis indicated a band at 2280 cm$^{-1}$ confirming the presence of isocyanate groups.

The colorless particles thus formed were subsequently colored by reaction with a yellow dye of Formula I following the procedure described in Example IV.

EXAMPLE IX

Preparation of cyan particles

Colorless polymeric particles having reactive stabilizers attached thereto were prepared by the addition of 0.45 gram of benzoyl peroxide to a mechanically stirred (50 rpm), deoxygenated mixture of 15.2 grams of freshly distilled lauryl methacrylate, 3.00 grams of isocyanato-ethyl methacrylate, and 0.25 gram of allyl methacrylate in 100 milliliters of toluene. The solution was stirred at 70° C. for 18 hours, after which the heat was removed and the solution was allowed to cool to room temperature. To 20 milliliters of the cooled solution were added 200 milliliters of Isopar ® G, 4 milliliters of methyl methacrylate, 34 milliliters of styrene, and 1.00 gram of benzoyl peroxide. The reaction mixture was stirred mechanically (50 rpm) at 70° C. for 20 hours. Particles formed during the process were washed by repeated centrifugation/resuspension cycles with 25 milliliters of cyclohexane. Infrared analysis indicated a band at 2280 cm$^{-1}$ confirming the presence of isocyanate groups. The colorless particles thus formed were subsequently colored by reaction with a cyan dye of Formula II following the procedure described in Example V.

EXAMPLE X

Preparation of a cyan liquid developer

A positively charged liquid developer is prepared by the addition of 2.0 grams of the cyan particles obtained from the process of Example V and 0.5 gram of zirconium octoate to 100 milliliters of Isopar ® G. The resulting suspension is homogenized by sonication, after which the colored particles will exhibit a charge to mass ratio of from about 100 to about 1,000 microcoulombs per gram.

EXAMPLE XI

Formation and development of images

The liquid developer of Example X is incorporated into an electrophotographic imaging test apparatus equipped to develop images with a liquid developer. Electrostatic latent images are formed on a layered organic photosensitive imaging member charged to about 800 volts in the apparatus and are then contacted with the developer composition. Subsequent to development, the images are transferred to a paper substrate. It is believed that the resulting images will be of excellent quality and resolution, in that, for example, they will have no background deposits.

Other embodiments and modifications of the present invention may occur to those skilled in the art subsequent to a review of the information presented herein; these embodiments and modifications, as well as equivalents thereof, are also included within the scope of this invention.

We claim:

1. A process for preparing particles colored with a dye which comprises: (a) forming, by a free radical dispersion polymerization process in a nonaqueous solution, polymeric particles with an average diameter of from about 0.1 to about 20 microns and comprising macroscopic polymeric core particles having attached thereto stabilizing copolymers with at least one functional group capable of undergoing a chemical reaction with a dye; (b) adding a dye to said polymeric particles; and (c) effecting a chemical reaction between said dye and said stabilizing copolymers, thereby resulting in said dye becoming covalently bonded to the stabilizing copolymer portions of said polymeric particles.

2. A process in accordance with claim 1 wherein the macroscopic polymeric core portions of said polymeric particles comprise a material selected from the group consisting of poly(vinyl acetate), poly(N-vinyl-2-pyrrolidone), poly(methyl methacrylate), poly(methyl acrylate), poly(ethyl acrylate), poly(ethyl methacrylate), poly(2-ethoxyethyl methacrylate), poly(butoxy ethoxy ethyl methacrylate), poly(dimethyl amino ethyl methacrylate), poly(acrylic acid), poly(methacrylic acid), poly(acrylamide), poly(methacrylamide), poly(acrylonitrile), poly(vinyl chloride), polystyrene, and poly(ureido-ethyl vinyl ether).

3. A process in accordance with claim 1 wherein the macroscopic polymeric core portions of said polymeric particles comprise a material selected from the group consisting of homopolymers of monomers selected from the group consisting of vinyl acetate, N-vinyl-2-pyrrolidone, methyl methacrylate, styrene, and ethyl acrylate; and copolymers of monomers selected from the group consisting of vinyl acetate, N-vinyl-2-pyrrolidone, and ethyl acrylate.

4. A process in accordance with claim 1 wherein said stabilizing copolymers comprises block copolymers containing a component selected from the group consisting of poly(alkyl acrylate), with the alkyl group having at least three carbon atoms, and poly(alkyl methacrylate), with the alkyl group having at least three carbon atoms and up to about 25 carbon atoms; and a component selected from the group consisting of poly(N-vinyl-2-pyrrolidone), poly(vinyl acetate), poly(ethyl acrylate), poly(methyl methacrylate), poly(methyl acrylate), or poly(styrene).

5. A process in accordance with claim 1 wherein said stabilizing copolymers comprise block copolymers selected from the group consisting of poly(vinyl acetate - b - dimethyl siloxane), poly(styrene - b - dimethyl siloxane), poly(styrene-b-hydrogenated isoprene, poly(methyl methacrylate - b - dimethylsiloxane), poly(vinyl acetate - b - isobutylene), poly(vinyl acetate - b - 2-ethyl hexyl methacrylate), poly(styrene-b-2-ethyl hexyl methacrylate), poly(ethyl methacrylate - b - 2-ethyl hexyl methacrylate), and poly(dimethylsiloxane-styrene-dimethyl siloxane).

6. A process in accordance with claim 1 wherein said stabilizing copolymers comprise a graft copolymer with a backbone portion selected from the group consisting of polyisobutylene; hydrogenated polybutadiene; hydrogenated polyisoprene; polydimethylsiloxane; poly(vinyl toluene); poly(12-hydroxy stearic acid); poly(iso bornyl methacrylate); acrylic polymers of long chain esters of acrylic acid selected from the group consisting of stearyl, lauryl, octyl, hexyl, and ethyl hexyl; methacrylic polymers of long chain esters of acrylic acid selected from the group consisting of stearyl, lauryl, octyl, hexyl, and ethyl hexyl; acrylic polymers of long chain esters of methacrylic acid selected from the group consisting of stearyl, lauryl, octyl, hexyl, and ethyl hexyl; methacrylic polymers of long chain esters of methacrylic acid selected from the group consisting of stearyl, lauryl, octyl, hexyl, and ethyl hexyl; polymeric vinyl esters of long chain acids selected from the group consisting of vinyl stearate, vinyl laurate, and vinyl palmitate; polymeric vinyl alkyl ethers; and graft portion selected from the group consisting of vinyl acetate; methyl acrylate; methyl methacrylate; ethyl acrylate;

ethyl methacrylate; acrylonitrile; acrylamide; methacrylonitrile; methacrylamide; acrylic acid, methacrylic acid; monoethyl maleate; monoethyl fumarate; styrene; maleic anhydride; maleic acid; and N-vinyl2pyrrolidone.

7. A process in accordance with claim 6 wherein said backbone portion is selected from the group consisting of polyisobutylene, copolymers of isobutylene with isoprene containing from 1 to 3 percent unsaturation, polydimethyl siloxane, poly(2-ethyl hexyl acrylate), poly(lauryl methacrylate), copolymers of acrylates with alkyl groups having from about 8 to about 12 carbon atoms, copolymers of methacrylates with alkyl groups having from about 8 to about 12 carbon atoms, and poly(2-ethyl hexyl methacrylate); and said graft portion is selected from the group consisting of vinyl acetate, N-vinyl-2-pyrrolidone, and ethyl acrylate.

8. A process in accordance with claim 1 wherein said stabilizing copolymer comprises monomer units possessing said functional group to permit said monomer units to comprise from about 1 to about 30 percent by weight of said stabilizing copolymer.

9. A process in accordance with claim 1 wherein said functional group is selected from the group consisting of isocyanate, acid chloride, and anhydride.

10. A process in accordance with claim 1 wherein said dye is selected from the group consisting of anthraquinone dyes, azo dyes, xanthene dyes, methine dyes, polymethine dyes, azamethine dyes, quinoline dyes, stilbene dyes, oxazine dyes, and mixtures thereof, and wherein said dye contains a functional group selected from the group consisting of hydroxyl and amino.

11. A process in accordance with claim 1 wherein said dye contains a functional group selected from the group consisting of hydroxyl and amino.

12. A process in accordance with claim 11 wherein said dye is selected from the group consisting of those of the following formulae:

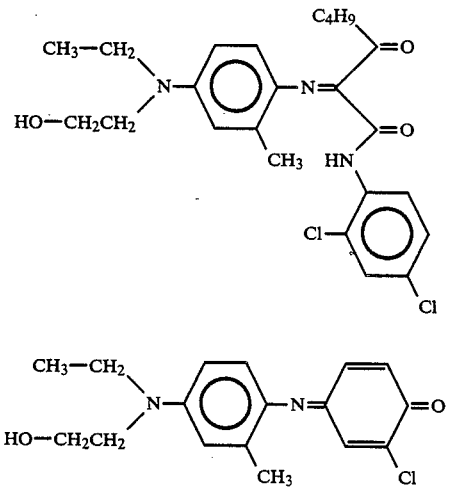

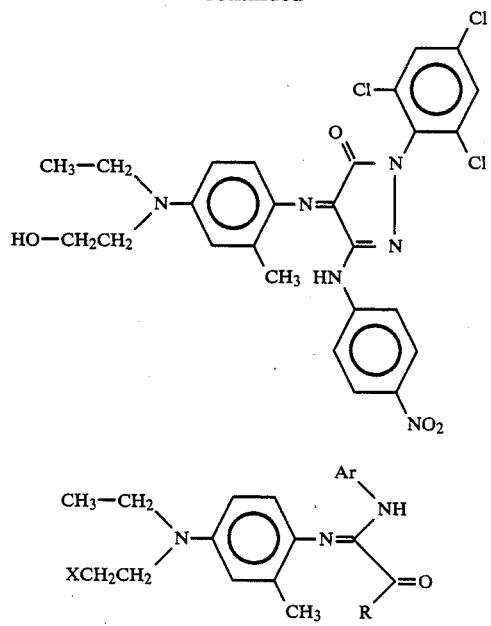

wherein X is selected from the group consisting of hydroxy and amino, R is an alkyl substituent with from 1 to about 20 carbon atoms, and Ar is an aromatic group selected from the group consisting of unsubstituted aromatic groups with from about 6 to about 24 carbon atoms and substituted aromatic groups with from about 6 to about 24 carbon atoms;

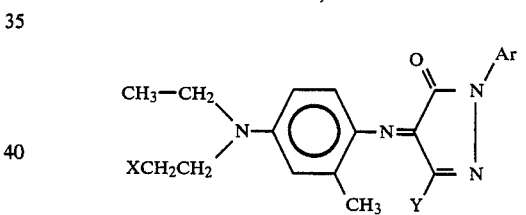

wherein X is selected from the group consisting of hydroxyl and amino, Y is selected from the group consisting of an alkyl group with from 1 to about 20 carbon atoms, an aromatic group with from 6 to about 24 carbon atoms, and alkyl group with from 1 to about 20 carbon atoms and with a functional substituent, an aromatic group with from 6 to about 24 carbon atoms, and a functional substituent, and Ar is an aromatic group selected from the group consisting of unsubstituted aromatic groups with from about 6 to about 24 carbon atoms and substituted aromatic groups with from about 6 to about 24 carbon atoms; and

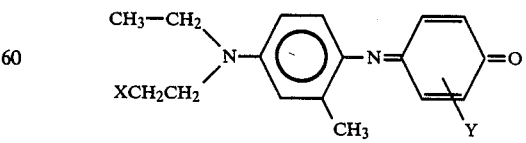

wherein X is selected from the group consisting of amino and hydroxyl, and Y is selected from the group consisting of methyl, ethyl, methoxy, halo, and acetamido;

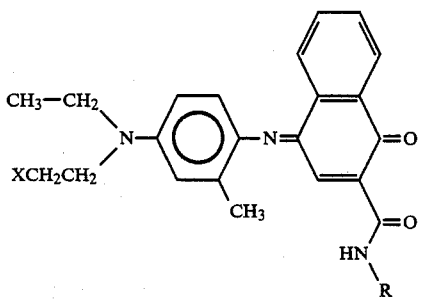

wherein X is selected from the group consisting of amino and hydroxyl, and R selected from the group consisting of an alkyl group with from 1 to about 20 carbon atoms and an aromatic group selected from the group consisting of unsubstituted aromatic groups with from about 6 to about 24 carbon atoms and substituted aromatic groups with from about 6 to about 24 carbon atoms; and mixtures thereof.

13. A process in accordance with claim 1 wherein said stabilizing copolymers are prepared by adding at least two different monomers to a nonaqueous solution in the presence of a free radical initiator, maintaining said solution at atmospheric pressure and a temperature of from about 50° to about 100° C., and stirring said solution.

14. A process in accordance with claim 1 wherein said stabilizing copolymers are prepared by adding at least two different monomers to a nonaqueous solution containing a selected backbone polymer in the presence of a free radical initiator, maintaining said solution at atmospheric pressure and a temperature of from about 60° to about 90° C., and stirring said solution.

15. A process in accordance with claim 1 wherein said polymeric particles having stabilizing copolymers attached thereto are prepared by adding a monomer to a nonaqueous solution containing polymeric stabilizer precursors in the presence of a free radial initiator at atmospheric pressure and at a temperature of from about 60° to about 90° C.

16. A process in accordance with claim 15 wherein said stabilizer precursors are polymers of monomers selected from the group consisting of polyisobutylene; hydrogenated polybutadiene; hydrogenated polyisoprene; polydimethylsiloxane; poly(vinyl toluene); poly(12-hydroxy stearic acid); poly(iso bornyl methacrylate); acrylic polymers of long chain esters of acrylic acid selected from the group consisting of stearyl, lauryl, octyl, hexyl, and ethyl hexyl; methacrylic polymers of long chain esters of acrylic acid selected from the group consisting of stearyl, lauryl, octyl, hexyl, and ethyl hexyl; acrylic polymers of long chain esters of methacrylic acid selected from the group consisting of stearyl, lauryl, octyl, hexyl; and ethyl hexyl; methacrylic polymers of long chain esters of methacrylic acid selected from the group consisting of stearyl, lauryl, octyl, hexyl, and ethyl hexyl; polymeric vinyl esters of long chain acids selected from the group consisting of vinyl stearate, vinyl laurate, and vinyl palmitate; polymeric vinyl alkyl ethers; and copolymers thereof.

17. A process in accordance with claim 1 wherein said polymeric particles having stabilizing copolymers attached thereto are prepared by adding a monomer to a nonaqueous solution containing said stabilizing copolymers in the presence of a free radical initiator at atmospheric pressure and at a temperature of from about 60° to about 90° C.

18. A process in accordance with claim 1 wherein said chemical reaction that results in said dye becoming covalently bonded to said polymeric particles is achieved by adding said dye to a suspension of said polymeric particles in a hydrocarbon solvent in the presence of a catalyst at a temperature of from about 0° to about 60° C. at atmospheric pressure.

19. A process in accordance with claim 1 wherein said chemical reaction that results in said dye becoming covalently bonded to said polymeric particles is a reaction between isocyanate groups on said stabilizing copolymers and amino or hydroxy groups on said dye.

20. A process in accordance with claim 1 wherein said functional group on said stabilizing copolymer is selected from the group consisting of isocyanate, acid chloride, and anhydride, said dye is selected from the group consisting of anthraquinone dyes, azo dyes, xanthene dyes, methine dyes, polymethine dyes, azamethine dyes, quinoline dyes, stilbene dyes, oxazine dyes, and mixtures thereof, and said dye contains a functional group selected from the group consisting of hydroxyl and amino.

21. A process for preparing particles colored with a dye which comprises;
(a) forming, by a free radical dispersion polymerization process in a nonaqueous solution, polymeric particles with an average diameter of from about 0.1 to about 20 microns and comprising macroscopic polymer core particles having attached thereto stabilizing copolymers with at least one functional group selected from the group consisting of isocyanate, acid chloride, and acid anhydride by mixing an excess amount of a core monomer to a solution containing said stabilizing copolymers in the presence of a free radical initiator, thereby resulting in the formation of said polymeric particles;
(b) adding to said mixture a dye containing a functional group selected from the group consisting of hydroxyl and amino to said polymeric particles; and
(c) effecting a chemical reaction between said dye and said stabilizing copolymers by adding to said mixture a catalyst, thereby resulting in said dye becoming covalently bonded to the stabilizing copolymer portions of said polymeric particles.

22. A process according to claim 21 wherein said free radical initiator is selected from the group consisting of benzoyl peroxide and azobisisobutyronitrile.

23. A process according to claim 21 wherein said polymeric particles are formed by maintaining said solution containing said core monomers, said stabilizing copolymers, and said free radical initiator at a temperature of from about 50° C. to about 100° C.

24. A process according to claim 23 wherein said solution is maintained at said temperature for a period of from about 8 to about 20 hours.

25. A process according to claim 21 wherein said catalyst is dibutyltindilaurate.

26. A process according to claim 21 wherein said chemical reaction between said dye and said stabilizing copolymers is effected by maintaining said mixture containing said catalyst, said dye, and said stabilizing copolymers at a temperature of from about 0° C. to about 60° C.

27. A process according to claim 26 wherein said mixture is maintained at said temperature for a period of from about 1 to about 24 hours.

28. A process for preparing particles colored with a dye which comprises:
(a) forming, by a free radical dispersion polymerization process in a nonaqueous solution, polymeric particles with an average diameter of from about 0.1 to about 20 microns and comprising macroscopic polymeric core particles having attached thereto stabilizing copolymers with at least one functional group selected from the group consisting of isocyanate, acid chloride, and acid anhydride by mixing an excess amount of a core monomer to a solution containing said stabilizing copolymers in the presence of a free radical initiator at a temperature of from about 50° C. to about 100° C. and maintaining said mixture at said temperature for from about 8 to about 20 hours, thereby resulting in the formation of said polymeric particles;
(b) adding to said mixture a dye containing a functional group selected from the group consisting of hydroxyl and amino to said polymeric particles; and
(c) effecting a chemical reaction between said dye and said stabilizing copolymers by adding to said mixture a catalyst and maintaining a resulting mixture at a temperature of from about 0° C. to about 60° C. for from about 1 to about 24 hours, thereby resulting in said dye becoming covalently bonded to the stabilizing copolymer portions of said polymeric particles.

29. A process according to claim 28 wherein said free radical initiator is selected from the group consisting of benzoyl peroxide and azobisisobutyronitrile.

30. A process according to claim 28 wherein said catalyst is dibutyltindilaurate.

* * * * *